US009598588B2

(12) United States Patent
Hsu et al.

(10) Patent No.: US 9,598,588 B2
(45) Date of Patent: Mar. 21, 2017

(54) CATIONIC ELECTRODEPOSITABLE COATING COMPOSITIONS CAPABLE OF FORMING LOW GLOSS COATINGS

(75) Inventors: Lorraine Hsu, Pittsburgh, PA (US); Kelly Moore, Dunbar, PA (US); Michael Sandala, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 450 days.

(21) Appl. No.: 13/472,901

(22) Filed: May 16, 2012

(65) Prior Publication Data
US 2013/0306477 A1 Nov. 21, 2013

(51) Int. Cl.
*C09D 133/08* (2006.01)
*C09D 133/10* (2006.01)
*C09D 5/44* (2006.01)

(52) U.S. Cl.
CPC .......... *C09D 5/4488* (2013.01); *C09D 5/4411* (2013.01); *C09D 5/4415* (2013.01); *C09D 5/4473* (2013.01)

(58) Field of Classification Search
CPC .. C09D 5/4473; C09D 5/4411; C09D 5/4415; C09D 5/4488
See application file for complete search history.

(56) References Cited

U.S. PATENT DOCUMENTS

| | | |
|---|---|---|
| 4,104,100 A | 8/1978 | Anders et al. |
| 4,151,143 A | 4/1979 | Blank et al. |
| 4,294,741 A | 10/1981 | Bosso |
| 4,297,261 A | 10/1981 | Jozwiak, Jr. |
| 4,304,703 A | 12/1981 | Das |
| 4,554,212 A | 11/1985 | Diefenbach et al. |
| 4,684,676 A | 8/1987 | Diefenbach et al. |
| 4,692,503 A | 9/1987 | Das et al. |
| 4,791,161 A | 12/1988 | Leising |
| 4,886,852 A | 12/1989 | Numa |
| 5,021,530 A | 6/1991 | Yamamoto et al. |
| 5,096,556 A | 3/1992 | Corrigan et al. |
| 5,128,396 A | 7/1992 | O'Neil et al. |
| 5,254,631 A | 10/1993 | Yamamoto et al. |
| 5,260,354 A | 11/1993 | Kaylo et al. |
| 5,525,666 A | 6/1996 | Hoenel et al. |
| 5,670,600 A | 9/1997 | Nienhaus et al. |
| 5,889,101 A | 3/1999 | Schlarb et al. |
| 5,929,161 A | 7/1999 | Schafheutle et al. |
| 5,936,026 A | 8/1999 | Huybrechts et al. |
| 6,054,033 A | 4/2000 | Hunakoshi et al. |
| 6,201,043 B1 | 3/2001 | Bremser et al. |
| 6,232,364 B1 * | 5/2001 | Fukuda .............. C08F 2/48 427/508 |
| 6,255,400 B1 | 7/2001 | Itoh et al. |
| 6,509,411 B1 | 1/2003 | Fieberg et al. |
| 6,646,041 B2 | 11/2003 | St. John Williams et al. |
| 2003/0054193 A1 | 3/2003 | McCollum et al. |
| 2003/0127332 A1 | 7/2003 | Bremser et al. |
| 2006/0135651 A1 * | 6/2006 | Nakane et al. ............. 523/201 |
| 2007/0015873 A1 * | 1/2007 | Fenn ........................ 525/191 |

FOREIGN PATENT DOCUMENTS

| | | |
|---|---|---|
| DE | 19917235 A1 | 10/2000 |
| EP | 0274389 | 7/1988 |
| EP | 0300612 | 10/1993 |
| EP | 0752496 | 1/1997 |
| EP | 1541647 | 6/2005 |
| EP | 1913097 | 8/2009 |
| JP | 04293973 | 10/1992 |
| JP | 2002212488 | 7/2002 |
| JP | 2008169308 A | 7/2008 |

OTHER PUBLICATIONS

Hsu, Lorraine et al., "Anionic Electrodepositable Coating Compositions Capable of Forming Low Gloss Coatings", U.S. Appl. No. 13/472,924, filed May 16, 2012.

* cited by examiner

Primary Examiner — Karuna P Reddy
(74) Attorney, Agent, or Firm — Charles M. Yeomans

(57) ABSTRACT

Disclosed herein are cationic electrodepositable coating compositions that are capable of providing cured coatings of low gloss.

20 Claims, No Drawings

CATIONIC ELECTRODEPOSITABLE COATING COMPOSITIONS CAPABLE OF FORMING LOW GLOSS COATINGS

FIELD

The present invention relates to electrodepositable coating compositions and low gloss coatings produced from such compositions.

BACKGROUND

Electrodeposition as a coating application method involves the deposition onto a conductive substrate of a film-forming composition under the influence of an applied electrical potential. Electrodeposition has gained popularity in the coatings industry because it provides higher paint utilization, outstanding corrosion resistance, and low environmental contamination as compared with non-electrophoretic coating methods. Both cationic and anionic electrodeposition processes are used commercially.

There are a number of applications in which it is desired to control the gloss of a coating layer applied by electrodeposition while retaining or improving other coating properties, such as corrosion resistance. Desirable electrodeposited coatings having a low gloss level that is retained after exterior exposure have, however, been very hard to prepare. The addition of traditional flatting agents such as silicas and alumina silicates to electrodepositable coating compositions can produce the desired gloss levels initially, but the finishes discolor and chalk quickly upon exposure to the elements. Furthermore, traditional flatting agents are often much more dense than other coating composition components and will settle in the electrocoat baths. As a result, continuous recirculation must be employed to maintain paint homogeneity, even when the bath is not in use. The need for continuous recirculation can lead to higher capital equipment costs, higher maintenance costs, and higher energy costs.

It is therefore highly desirable to provide cationic electrodepositable coating compositions that address at least some of the deficiencies discussed above.

SUMMARY OF THE INVENTION

In certain respects, the present invention is directed to electrodepositable coating compositions. These coating compositions comprise: (a) an acrylic polymer that is a polymerization product of a dispersion of a polymerizable ethylenically unsaturated monomer composition in a dispersing medium comprising water in the presence of a cationic salt group containing polymeric dispersant that has a Mz of 200,000 to 2,000,000, wherein the monomer composition comprises a monomer comprising three or more ethylenically unsaturated groups per molecule; (b) a cationic salt group containing polymer different from the acrylic polymer and the polymeric dispersant; and (c) a curing agent. In these coating compositions, the sum of the acrylic polymer and the polymeric dispersant in the coating composition is greater than 5.0 percent by weight, based on the total weight of resin solids in the composition.

The present invention also relates to methods for using such compositions and substrates at least partially coated with a low gloss coating deposited from such a composition.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, certain embodiments of the present invention are directed to electrodepositable coating compositions. As used herein, the term "electrodepositable coating composition" refers to a composition that is capable of being deposited onto an electrically conductive substrate under the influence of an applied electrical potential.

The electrodepositable coating compositions of the present invention comprise an acrylic polymer that is a polymerization product of a polymerizable ethylenically unsaturated monomer composition in a dispersing medium comprising water in the presence of a cationic salt group containing polymeric dispersant that has a Mz of 200,000 to 2,000,000.

As used herein, the terms "cationic salt group containing polymer" and "cationic salt group containing polymeric dispersant" refer to cationic polymers comprising at least partially neutralized cationic functional groups, such as sulfonium groups and amine groups, that impart a positive charge. As used herein, the term "polymer" encompasses, but is not limited to, oligomers and both homopolymers and copolymers.

In certain embodiments, the acrylic polymer and the polymeric dispersant comprise active hydrogen functional groups. As used herein, the term "active hydrogen functional groups" refers to those groups that are reactive with isocyanates as determined by the Zerewitnoff test as is described in the JOURNAL OF THE AMERICAN CHEMICAL SOCIETY, Vol. 49, page 3181 (1927). In certain embodiments, the active hydrogen functional groups are derived from hydroxyl groups, primary amine groups and/or secondary amine groups.

In certain embodiments, the cationic salt group containing polymeric dispersant is itself an acrylic polymer and is prepared, for example, by traditional free radical initiated polymerization techniques, such as solution polymerization techniques, wherein an ethylenically unsaturated polymerizable monomer composition containing one or more vinyl monomers is subjected to free radical initiated addition polymerization conditions, for example, by heating in the presence of a free radical initiator.

The polymeric dispersant can be prepared in organic solution by techniques well known in the art. For example, the polymeric dispersant can be prepared by conventional free radical initiated solution polymerization techniques in which the polymerizable monomers are dissolved in a solvent or mixture of solvents and polymerized in the presence of a free radical initiator. Examples of suitable solvents which can be used for organic solution polymerization include alcohols, such as ethanol, tertiary butanol, and tertiary amyl alcohol; ketones, such as acetone, methyl ethyl ketone; and ethers, such as dimethyl ether of ethylene glycol. Examples of suitable free radical initiators include those which are soluble in the mixture of monomers, such as azobisisobutyronitrile, azobis-(alpha, gamma-dimethylvaleronitrile), tertiary-butyl perbenzoate, tertiary-butyl peracetate, benzoyl peroxide, and ditertiary-butyl peroxide. In certain embodiments, the free radical initiator is present in an amount between 0.01 weight percent and 6 weight percent, such as between 1.0 weight percent and 4.0 weight percent, or, in some cases, between 2.0 weight percent and about 3.5 weight percent, based on the weight of the polymerizable ethylenically unsaturated monomer composition used to make the polymeric dispersant.

In certain embodiments, to prepare the polymeric dispersant, the solvent is first heated to reflux and the mixture of polymerizable monomers containing a free radical initiator is added slowly to the refluxing solvent. The reaction mixture is held at polymerizing temperatures so as to reduce the free monomer content to below 1.0 percent, such as below 0.5 percent. Suitable specific conditions for forming such polymers include those set forth in the Examples.

Examples of suitable vinyl monomers that may be used in the ethylenically unsaturated polymerizable monomer composition used to make the acrylic polymeric dispersant include, without limitation, monoolefinic and diolefinic hydrocarbons, such as $C_1$-$C_{18}$ alkyl (meth)acrylates. Specific examples include, without limitation, methyl (meth)acrylate, ethyl (meth)acrylate, butyl (meth)acrylate, hexyl (meth)acrylate, octyl (meth)acrylate, isodecyl (meth)acrylate, stearyl (meth)acrylate, 2-ethylhexyl (meth)acrylate, isobornyl (meth)acrylate and t-butyl (meth)acrylate. In certain embodiments, the $C_1$-$C_{18}$ alkyl (meth)acrylates are used in an amount of up to 90 percent by weight, such as 50 up to 70 percent by weight, based on total weight of the ethylenically unsaturated polymerizable monomer composition used to make the polymeric dispersant. As used herein, (meth)acrylate and like terms encompasses both acrylates and methacrylates.

In certain embodiments, the ethylenically unsaturated monomer composition used to make the acrylic polymeric dispersant comprises one or more substituted alkyl esters, for example, hydroxyalkyl esters, such as hydroxyethyl, hydroxypropyl, and/or hydroxybutyl (meth)acrylate. In certain embodiments, such monomer(s) are used in amounts of up to 40 percent by weight, such as 5 to 25 percent by weight, based on total weight of the ethylenically unsaturated polymerizable monomer composition used to make the polymeric dispersant.

In certain embodiments, the ethylenically unsaturated monomer composition used to make the acrylic polymeric dispersant comprises one or more vinyl aromatic compounds, such as styrene, alpha-methyl styrene, alpha-chloromethyl styrene and vinyl toluene. In certain embodiments, the vinyl aromatic compound(s) are used in amounts of up to 20 percent by weight, such as 1 to 10 percent by weight, based on total weight of the ethylenically unsaturated polymerizable monomer composition used to make the polymeric dispersant.

Epoxide functional groups (for conversion to cationic salt groups via reaction with an amine) may be incorporated into the acrylic polymeric dispersant by using epoxide functional monomers, such as glycidyl acrylate and methacrylate, 3,4-epoxycyclohexylmethyl(meth)acrylate, 2-(3,4-epoxycyclohexyl)ethyl(meth)acrylate, or allyl glycidyl ether. Alternatively, epoxide functional groups may be incorporated into the acrylic polymer by reacting carboxyl groups on the acrylic polymer with an epihalohydrin or dihalohydrin, such as epichlorohydrin or dichlorohydrin. In certain embodiments, epoxide functional monomer(s) are used in amounts of up to 30 percent by weight, such as 10 to 20 percent by weight, based on the total weight of the ethylenically unsaturated polymerizable monomer composition used to make the polymeric dispersant.

Non-limiting examples of other vinyl monomers suitable for use as part of the ethylenically unsaturated polymerizable monomer compositions used to make the acrylic polymeric dispersant are ethylenically unsaturated monomers having more than one site of unsaturation, examples of which include ethylene glycol dimethacrylate, allyl methacrylate, hexanediol diacrylate, methacrylic anhydride, tetraethylene glycol diacrylate, tripropylene glycol diacrylate, pentaerythritol tetraacrylate, di-pentaerythritoltriacrylate, di-pentaerythritolpentaacrylate, ethoxylated trimethylolpropane triacrylate having 0 to 20 ethoxy units, and ethoxylated trimethylolpropane trimethacrylate having 0 to 20 ethoxy units. In certain embodiments, ethylenically unsaturated monomer(s) having more than one site of unsaturation are used in amounts of up to 10 percent by weight, such as 0.1 to 5 percent by weight, based on the total weight of the ethylenically unsaturated polymerizable monomer composition used to make the polymeric dispersant.

In certain embodiments, the polymeric dispersant has a sufficient cationic salt group content to stabilize a subsequent polymerization of an ethylenically unsaturated polymerizable monomer composition (described below) and to provide for a stable electrodepositable coating composition. Also, in certain embodiments, the cationic polymeric dispersant has sufficient cationic salt group content so that, when used with the other film-forming resins in the electrodepositable coating composition, the composition upon being subjected to electrodeposition conditions will deposit as a coating on the substrate. In certain embodiments, the polymeric dispersant will contain from 0.1 to 5.0, such as 0.3 to 1.1 milliequivalents of cationic salt groups per gram of polymer solids.

In certain embodiments, a chain transfer agent can be used in the synthesis of the polymeric dispersant, such as those that are soluble in the mixture of monomers. Suitable non-limiting examples of such agents include alkyl mercaptans, for example, tertiary-dodecyl mercaptan; ketones, such as methyl ethyl ketone; and chlorohydrocarbons, such as chloroform.

In the compositions of the present invention, the polymeric dispersant has a Z-average molecular weight (Mz), as obtained by gel permeation chromatography carried out in dimethylformamide (DMF) as the mobile solvent using polystyrene standards in an art-recognized manner, that is from 200,000 to 2,000,000, such as from 450,000 to 2,000,000, or 450,000 to 1,000,000 or 450,000 to 600,000.

In certain embodiments, the polymeric dispersant is, prior to or during dispersion in a dispersing medium comprising water, at least partially neutralized by, for example, treating with an acid to form a water-dispersible cationic salt group containing polymeric dispersant. Non-limiting examples of suitable acids are inorganic acids, such as phosphoric acid and sulfamic acid, as well as organic acids, such as, acetic acid and lactic acid, among others. Besides acids, salts such as dimethylhydroxyethylammonium dihydrogenphosphate and ammonium dihydrogenphosphate can be used. In certain embodiments, the polymeric dispersant is neutralized to the extent of at least 50 percent or, in some cases, at least 70 percent, of the total theoretical neutralization equivalent. The step of dispersion may be accomplished by combining the neutralized or partially neutralized polymeric dispersant with the water of the dispersing phase. Neutralization and dispersion can be accomplished in one step by combining the polymeric dispersant and the water. The polymeric dispersant (or its salt) can be added to the dispersing phase medium or the dispersing phase can added to the polymeric dispersant (or its salt). In certain embodiments, the pH of the dispersion is within the range of 5 to 9.

The electrodepositable coating compositions of the present invention comprise an acrylic polymer that is a polymerization product of a dispersion of a polymerizable ethylenically unsaturated monomer composition in a dispersing medium comprising water in the presence of the polymeric dispersant. In certain embodiments, such a polymer is obtained by (a) dispersing an ethylenically unsaturated polymerizable monomer composition and a free radical initiator in the dispersing medium in the presence of the at least partially neutralized polymeric dispersant described earlier, and (b) subjecting the dispersion to emulsion polymerization conditions, for example, by heating in the presence of a free radical initiator, to form an aqueous acrylic polymer dispersion.

In certain embodiments, the acrylic polymer is prepared from an ethylenically unsaturated polymerizable monomer composition that is substantially free or, in some case, completely free, of diene monomers. As used herein, when it is stated that an ethylenically unsaturated polymerizable monomer composition is "substantially free" of diene monomers, it means that diene monomers are present in the monomer composition in an amount of less than 10 percent by weight, such as less than 5 percent by weight, less than 2 percent by weight, or, in some cases, less than 1 or 0.1 percent by weight, based on the total weight of the ethylenically unsaturated polymerizable monomers used to make the acrylic polymer.

Examples of suitable monomers that may be used in the ethylenically unsaturated polymerizable monomer composition used to prepare the acrylic polymer include, without limitation, the monomers described above with respect to the preparation of the polymeric dispersant, provided, however, that in the coating compositions of the present invention, the unsaturated polymerizable monomer composition used to prepare the acrylic polymer comprises a monomer comprising three or more ethylenically unsaturated groups per molecule.

For example, in some cases, the ethylenically unsaturated polymerizable monomer composition used to prepare the acrylic polymer comprises a monoolefinic and/or diolefinic hydrocarbon, such as the $C_1$-$C_{18}$ alkyl (meth)acrylates described earlier. In some cases, the $C_1$-$C_{18}$ alkyl (meth)acrylate(s) are used in an amount of up to 80 percent by weight, such as 20 up to 60 percent by weight, based on total weight of the ethylenically unsaturated polymerizable monomer composition used to make the acrylic polymer.

In certain embodiments, the ethylenically unsaturated polymerizable monomer composition used to prepare the acrylic polymer comprises a substituted alkyl ester, for example, hydroxyalkyl esters, such as hydroxyethyl, hydroxypropyl, and/or hydroxybutyl (meth)acrylate described earlier. In certain embodiments, such monomer(s) are used in amounts of up to 20 percent by eight, such as 5 to 15 percent by weight, based on total weight of the ethylenically unsaturated polymerizable monomer composition used to make the acrylic polymer.

In certain embodiments, the ethylenically unsaturated polymerizable monomer composition used to prepare the acrylic polymer comprises a vinyl aromatic compound, such as any of those mentioned earlier. In certain embodiments, the vinyl aromatic compound(s) are used in amounts of up to 80 percent by weight, such as 20 to 60 percent by weight, based on total weight of the ethylenically unsaturated polymerizable monomer composition used to make the composition used to make the acrylic polymer.

Non-limiting examples of monomers comprising three or more ethylenically unsaturated groups per molecule, which are suitable for use in preparing the acrylic polymer, include, without limitation, trimethylolpropane triacrylate, pentaerythritol tetraacrylate, di-pentaerythritoltriacrylate, di-pentaerythritolpentaacrylate, ethoxylated trimethylolpropane triacrylate having 0 to 20 ethoxy units, and ethoxylated trimethylolpropane trimethacrylate having 0 to 20 ethoxy units. In certain embodiments, ethylenically unsaturated monomer(s) having three or more sites of unsaturation are used in amounts of up to 10 percent by weight, such as 0.1 to 5 percent by weight, based on the total weight of the ethylenically unsaturated polymerizable monomer composition used to make the acrylic polymer.

As previously indicated, in the electrodepositable coating compositions of the present invention, the acrylic polymer is prepared via polymerization of an ethylenically unsaturated polymerizable monomer composition in a dispersing medium comprising water and the previously described polymeric dispersant. In certain embodiments, the monomer composition is dispersed in the water in the presence of the polymeric dispersant and subjected to addition polymerization conditions by heating in the presence of a free radical initiator. The time and temperature of polymerization will depend on one another, the ingredients selected and, in some cases, the scale of the reaction. In certain embodiments, the polymerization is conducted at 40° C. to 100° C. for 2 to 20 hours.

The free radical initiator utilized for the polymerization may be selected from any of those used for aqueous latex polymerization techniques, including redox pair initiators, peroxides, hydroperoxides, peroxydicarbonates, azo compounds and the like.

In certain embodiments, the free radical initiator is present in an amount between 0.01 weight percent and 5 weight percent, such as between 0.05 weight percent and 2.0 weight percent, or, in some cases, between 0.1 weight percent and about 1.5 weight percent, based on the weight of the polymerizable ethylenically unsaturated monomer composition. In certain embodiments, a chain transfer agent that is soluble in the monomer composition, such as alkyl mercaptans, for example, tertiary-dodecyl mercaptan, 2-mercaptoethanol, isooctyl mercaptopropionate, n-octyl mercaptan or 3-mercapto acetic acid is used in the polymerization of the ethylenically unsaturated polymerizable monomer composition. Other chain transfer agents such as ketones, for example, methyl ethyl ketone, and chlorocarbons such as chloroform can be used. In certain embodiments, the amount of chain transfer agent, if any, is from 0.1 to 6.0 weight percent by weight based on the weight of ethylenically unsaturated polymerizable monomer composition.

In certain embodiments, relatively high molecular weight multifunctional mercaptans may be substituted, all or partially, for the chain transfer agent. These molecules can, for example, range in molecular weight from about 94 to 1000 or more. Functionality can be from about 2 to about 4. Amounts of these multifunctional mercaptans, if used, may, in certain embodiments, be 0.1 to 6.0 percent by weight based on the weight of the ethylenically unsaturated polymerizable monomer composition.

In certain embodiments, the coating compositions of the present invention comprise 2 to 50 weight percent, such as 20 to 35 weight percent, of the polymeric dispersant and from 50 to 98 weight percent, such as 65 to 80 weight percent by weight, of the acrylic polymer polymerized in the presence of the dispersant, wherein these weight percentages are based on the total weight of the dispersant and the acrylic polymer polymerized in the presence of the dispersant.

In certain embodiments, for polymerization of the acrylic polymer in the presence of the polymeric dispersant, water is present in amounts of 40 to 90, such as 50 to 75 percent by weight, based on total weight of the dispersant, the dispersed phase and the dispersing medium.

Besides water, the dispersing medium can, in certain embodiments, contain some organic cosolvents. In certain embodiments, the organic cosolvents are at least partially soluble with water. Examples of such solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic cosolvents are, in certain embodiments, used in amounts less than 10 percent by weight, such as less than 5 percent by weight, based on total weight of the dispersing medium.

The electrodepositable coating compositions of the present invention comprise a cationic salt group containing polymer (b) that is different from the acrylic polymer and the polymeric dispersant described above. Examples of such polymers, which are suitable for use in the present invention, include cationic salt group containing polyepoxides, acrylics, polyamides, polyurethanes, and polyesters, among others. In certain embodiments, such polymers comprise reactive functional groups, such as hydroxyl, carboxyl, carbamate, epoxy, isocyanate, acetoacetate, amine-salt, and mercaptan groups, including combinations thereof.

Suitable cationic salt group containing polymers for use as component (b) in the electrodepositable coating compositions of the present invention include, for example, those that are substantially free of diene-derived polymeric material (as described above).

Suitable cationic salt group containing polymers for use as component (b) in the electrodepositable coating compositions of the present invention also include, for example, high throwpower amine salt group-containing resins which are the acid-solubilized reaction products of polyepoxides and primary and secondary amines such as are described in U.S. Pat. No. 4,031,050 at col. 3, line 27 to col. 5, line 8, this portion of which being incorporated herein by reference. In some cases, these amine salt group containing resins are used in combination with a blocked isocyanate curing agent such as those discussed more fully below. In addition, the electrodepositable coating compositions of the present invention can include low throwpower resins such as cationic acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which are incorporated herein by reference.

Besides amine salt group-containing resins, quaternary ammonium salt group-containing resins can also be employed as component (b) in the coating compositions of the present invention. Examples of these resins are those which are formed from reacting an organic polyepoxide with a tertiary amine acid salt. Such resins are described in U.S. Pat. No. 3,962,165 at col. 2, line 3 to col. 11, line 7; U.S. Pat. No. 3,975,346 at col. 1, line 62 to col. 17, line 25 and U.S. Pat. No. 4,001,156 at col. 1, line 37 to col. 16, line 7, these portions of which being incorporated herein by reference. Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at p. 2, line 1 to p. 6, line 25, this portion of which being incorporated herein by reference, can also be employed.

Also suitable for use as component (b) in the coating compositions of the present invention are polymers that may form photodegradation resistant electrodepositable coating compositions. Such polymers include the polymers comprising cationic amine salt groups which are derived from pendant and/or terminal amino groups that are disclosed in United States Patent Application Publication 2003/0054193 A1 at [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in United States Patent Application Publication US 2003/0054193 A1 at to [0123], this portion of which being incorporated herein by reference.

The electrodepositable coating compositions of the present invention comprise a curing agent to react with the reactive groups, such as active hydrogen groups, of the cationic salt group containing polymers. Non-limiting examples of suitable curing agents are at least partially blocked polyisocyanates, aminoplast resins and phenolic resins, such as phenolformaldehyde condensates including allyl ether derivatives thereof.

Suitable at least partially blocked polyisocyanates include aliphatic polyisocyanates, aromatic polyisocyanates, and mixtures thereof. In certain embodiments, the curing agent comprises an at least partially blocked aliphatic polyisocyanate. Suitable at least partially blocked aliphatic polyisocyanates include, for example, fully blocked aliphatic polyisocyanates, such as those described in U.S. Pat. No. 3,984,299 at col. 1 line 57 to col. 3 line 15, this portion of which is incorporated herein by reference, or partially blocked aliphatic polyisocyanates that are reacted with the polymer backbone, such as is described in U.S. Pat. No. 3,947,338 at col. 2 line 65 to col. 4 line 30, this portion of which is also incorporated herein by reference. By "blocked" is meant that the isocyanate groups have been reacted with a compound such that the resultant blocked isocyanate group is stable to active hydrogens at ambient temperature but reactive with active hydrogens in the film forming polymer at elevated temperatures usually between 90° C. and 200° C. In certain embodiments, the polyisocyanate curing agent is a fully blocked polyisocyanate with substantially no free isocyanate groups.

In certain embodiments, the curing agent comprises a diisocyanate, though, in other embodiments, higher polyisocyanates are used in lieu of or in combination with diisocyanates. Examples of aliphatic polyisocyanates suitable for use as curing agents include cycloaliphatic and araliphatic polyisocyanates such as 1,6-hexamethylene diisocyanate, isophorone diisocyanate, bis-(isocyanatocyclohexyl)methane, polymeric 1,6-hexamethylene diisocyanate, trimerized isophorone diisocyanate, norbornane diisocyanate and mixtures thereof. In certain embodiments of the present invention, the curing agent comprises a fully blocked polyisocyanate selected from a polymeric 1,6-hexamethylene diisocyanate, isophorone diisocyanate, and mixtures thereof. In other embodiments of the present invention the polyisocyanate curing agent comprises a fully blocked trimer of hexamethylene diisocyanate available as Desmodur N3300® from Bayer Corporation.

In certain embodiments, the polyisocyanate curing agent is at least partially blocked with at least one blocking agent selected from a 1,2-alkane diol, for example 1,2-propanediol; a 1,3-alkane diol, for example 1,3-butanediol; a benzylic alcohol, for example, benzyl alcohol; an allylic alcohol, for example, allyl alcohol; caprolactam; a dialkylamine, for example dibutylamine; and mixtures thereof. In certain embodiments, the polyisocyanate curing agent is at least partially blocked with at least one 1,2-alkane diol having three or more carbon atoms, for example 1,2-butanediol.

In certain embodiments, the blocking agent comprises other well known blocking agents such as aliphatic, cycloaliphatic, or aromatic alkyl monoalcohols or phenolic compounds, including, for example, lower aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime.

Examples of suitable aminoplast resins include those described in U.S. Pat. No. 3,937,679 at col. 16, line 3 to col. 17, line 47, this portion of which being hereby incorporated by reference. As is disclosed in the aforementioned portion of the '679 patent, the aminoplast can be used in combination with the methylol phenol ethers.

The resin solids content of the coating compositions of the present invention depends upon the particular end use of the dispersion and is often not critical. Coating compositions containing at least 1 percent by weight, such as from 5 to 40 percent by weight or 5 to 20 percent by weight, resin solids are common. By resin solids is meant the non volatile organic content of the composition, i.e., organic materials which will not volatilize when heated to 110° C. for 15 minutes and would exclude organic solvents.

In the coating compositions of the present invention, the sum of the polymeric dispersant and the acrylic polymer prepared in the presence of the dispersant in the coating composition is greater than 5.0 percent by weight, based on the total weight of resin solids in the coating composition. More specifically, in certain embodiments, the sum of the polymeric dispersant and the acrylic polymer prepared in the presence of the dispersant in the coating composition is at least 6.0 percent by weight, at least 8.0 percent by weight, at least 10.0 percent by weight, at least 15.0 percent by weight, at least 20.0 percent by weight, at least 25.0 percent by weight, or in some cases, at least 30.0 percent by weight, based on the total weight of resin solids in the coating composition. In the coating compositions of the present invention, the sum of the polymeric dispersant and the acrylic polymer prepared in the presence of the dispersant in the coating composition is no more than 50.0 percent by weight, such as no more than 45.0 or, in some cases, no more than 40.0 percent by weight, based on the total weight of resin solids in the coating composition. Indeed, it has been discovered that the presence of such polymers in the coating compositions of the present invention, in a sufficient amount (within the ranges described above) is critical to achieving the low gloss coatings sought by the present invention. For example, cured coatings having 20° gloss values of no more than 10, such as no more than 5 or no more than 3, have been achieved by the coating compositions of the present invention.

In certain embodiments, the coating compositions of the present invention comprise a catalyst to catalyze the reaction between the curing agent and the film-forming polymers. Suitable cure catalysts include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate). In certain embodiments, the cure catalyst comprises a cyclic guanidine as described in U.S. Pat. No. 7,842,762 at col. 1, line 53 to col. 4, line 18 and col. 16, line 62 to col. 19, line 8, the cited portions of which being incorporated herein by reference.

In some instances, a pigment composition, and if desired, various additives such as fillers, plasticizers, anti-oxidants, UV light absorbers, defoamers, fungicides, flow control agents, surfactants or wetting agents are included in the coating compositions of the present invention. The pigment composition may be of the conventional types, comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as the pigment-to-resin weight ratio. In the practice of the present invention, the pigment-to-resin weight ratio is sometimes within the range of 0.03 to 0.35, when pigment is used. The other additives mentioned above are usually in the dispersion in amounts of 0.01 to 3 percent by weight based on total weight of resin solids.

In certain embodiments, the coating compositions of the present invention are deposited upon a electrically conductive substrate by placing the composition in contact with an electrically conductive anode and an electrically conductive cathode, with the surface to be coated being the cathode. Following contact with the composition, an adherent film of the coating composition is deposited on the cathode and a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, but is often between 50 and 500 volts. The current density is often between 0.5 ampere and 15 amperes per square foot and tends to decrease during electrodeposition indicating the formation of an insulating film.

Once the electrodepositable coating composition is electrodeposited over at least a portion of the electroconductive substrate, the coated substrate is heated to a temperature and for a time sufficient to cure the electrodeposited coating on the substrate. In certain embodiments, the coated substrate is heated to a temperature ranging from 250° F. to 450° F. (121.1° C. to 232.2° C.), such as from 275° F. to 400° F. (135° C. to 204.4° C.), or, in some cases, from 300° F. to 360° F. (149° C. to 180° C.). The curing time can be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate. For example, the curing time can range from 10 minutes to 60 minutes, such as 20 to 40 minutes.

In certain embodiments, the coated substrate is heated to a temperature of 360° F. (180° C.) or less for a time sufficient to effect cure of the electrodeposited coating on the substrate. The thickness of the resultant cured coating often ranges from 15 to 50 microns.

The electrodepositable coating compositons of the present invention can also, if desired, be applied to a substrate using non-electrophoretic coating application techniques, such as flow, dip, spray and roll coating applications. For electrodeposition and non-electrophoretic coating applications, the coating compositions of the present invention can be applied to a variety of electroconductive substrates especially metal such as steel, aluminum, copper, magnesium and the like, but also including metallized plastic and conductive carbon-coated materials. For non-electrophoretic coating applications, compositions can be applied to the non-metallic substrates such as glass, wood and plastic.

In certain embodiments, therefore, the present invention is also directed to methods for coating an electroconductive substrate. In certain embodiments, such methods comprise (a) electrophoretically depositing on the substrate an electrodepositable coating composition of the present invention and (b) heating the coated substrate to a temperature and for a time sufficient to cure the electrodeposited coating on the substrate. In certain embodiments, such methods comprise (a) electrophoretically depositing on the substrate an electrodepositable coating composition of the present invention to form an electrodeposited coating over at least a portion of the substrate, (b) heating the coated substrate to a temperature and for a time sufficient to cure the electrodeposited coating on the substrate, (c) applying directly to the cured electrodeposited coating one or more pigment-containing coating compositions and/or one or more pigment-free coating compositions to form a top coat over at least a portion of the cured electrodeposited coating, and (d) heating the coated substrate of step (c) to a temperature and for a time sufficient to cure the top coat.

Illustrating the invention are the following examples, which, however, are not to be considered as limiting the invention to their details. Unless otherwise indicated, all parts and percentages in the following examples, as well as throughout the specification, are by weight.

EXAMPLE

Example 1

Synthesis of Cationic Salt Group Containing Polymeric Dispersant

A cationic acrylic polymeric dispersant was formed having the formulation disclosed in Table 1. To prepare the dispersant, Charge 1 was added to a 4-necked flask fitted with a thermocouple, nitrogen sparge, and a mechanical stirrer. Under an $N_2$ blanket and agitation, the flask was heated to reflux with a temperature set point of 100° C. Charges 2 and 3 were added dropwise from an addition funnel over 150 minutes followed by a 30 minute hold. After increasing the temperature to 120° C., charge 4 was subsequently added over 15 minutes followed by a 10 minute hold. The temperature was decreased to 90° C. while adding charge 5 to help cool the reaction. Charge 6 was added and held for 3 hours at 85° C. During the hold, add 7 was heated to approximately 35-40° C. in a separate container outfitted with a mechanical stirrer. After the hold, the contents from the reactor were dispersed into 7 under rapid agitation, then held for 60 minutes. Charge 8 was added under agitation as the dispersant continued to cool to ambient temperature.

TABLE 1

| Charge | Chemical | Parts by Weight |
|---|---|---|
| 1 | Dowanol ™ PNB | 26.2 |
|   | Dowanol ™ PM | 33.7 |
|   | Butyl cellosolve | 80.0 |
|   | Deionized water | 5.6 |
| 2 | Ethyl acrylate | 70.7 |
|   | Styrene | 12.4 |
|   | Hydroxypropyl methacrylate | 27.9 |
|   | Methyl methacrylate | 52.1 |
|   | Glycidyl methacrylate | 18.6 |
|   | Allyl methacrylate | 3.7 |
|   | t-Dodecyl mercaptan | 1.9 |
| 3 | Vazo 67 | 4.7 |
|   | Dowanol ™ PNB | 6.0 |
|   | Dowanol ™ PM | 3.0 |
|   | Methyl isopropyl ketone | 2.4 |
| 4 | Lupersol 7M50 | 3.7 |
|   | Dowanol ™ PNB | 3.0 |
|   | Dowanol ™ PM | 1.5 |
| 5 | Butyl cellosolve | 16.2 |
| 6 | Thiodiethanol | 30.3 |
|   | Lactic acid* | 8.9 |
|   | Ricinoleic acid | 3.7 |
|   | Deionized water | 6.7 |
| 7 | Deionized water | 580.2 |
| 8 | Deionized water | 143.1 |

*Lactic acid concentration at 88% under aqueous conditions.

The product yielded a solids percent of 17.1%. GPC analyses to determine polymer weight and Z average showed values of 134,571 and 519,266, respectively and were done with DMF using polystyrene standards.

Example 2

Synthesis of Acrylic Polymer in the Presence of a Polymeric Dispersant

A cationic salt group containing aqueous resinous dispersion was formed having the formulation disclosed in Table 2. To prepare the dispersion, Charge 1 was added to a 4-necked flask fitted with a thermocouple, nitrogen sparge, and a mechanical stirrer. Under an $N_2$ blanket and rigorous stirring, the flask was heated to 50° C. At 50° C., the solution was sparged under nitrogen for an additional 30 minutes. Charges 2 and 3 were mixed then added to an additional funnel; the solution was continuously agitated using a nitrogen bubbler. Charge 4 was added to a second additional funnel. Both solutions were added over 180 min at 50° C., then held for 30 minutes. Charges 5 and 6 were added and held for 30 minutes at 50° C.

TABLE 2

| Charge | Chemical | Parts by Weight |
|---|---|---|
| 1 | Product of Example 1 | 494.2 |
|   | Deionized water | 575.7 |
| 2 | Product of Example 1 | 54.9 |
|   | Ethyl acrylate | 105.1 |
|   | Styrene | 112.6 |
|   | Hydroxypropyl methacrylate | 25.0 |
|   | Trimethylolpropane triacrylate | 7.5 |
| 3 | Deionized water | 155.2 |
|   | Hydrogen peroxide (aq. 35%) | 3.8 |
| 4 | Iso-ascorbic acid | 0.7 |
|   | Deionized water | 162.9 |
| 5 | Deionized water | 5.5 |
|   | Hydrogen peroxide (aq. 35%) | 0.11 |
| 6 | Iso-ascorbic acid | 0.11 |
|   | Deionized water | 5.5 |

The aqueous resin dispersion had a solids percent of 19.0%. GPC analyses to determine polymer weight and Z average showed values of 847,773 and 1,127,777, respectively and were done with DMF using polystyrene standards.

Example 3

Preparation of Cationic Electrodepositable Coating Composition

A cationic sulfonium acrylic electrodepositable coating composition was formed having the formulation disclosed in Table 3. To prepare the coating composition, Charge 1 was added to a one gallon container and diluted with a portion of charge 4. This was then placed under agitation. Charge 2 was diluted with a portion of Charge 4 and added to the diluted charge 1. Charge 3 was diluted with charge 4 and added to the previous mixture. The remainder of charge 4 was added to form the coating composition. In this coating composition, the sum of the polymer (i) and polymeric dispersant (ii) in the coating composition was 30 percent by weight, based on the total weight of resin solids in the composition.

TABLE 3

|   | Chemical | Parts by Weight |
|---|---|---|
| 1 | CR920H[1] | 452.2 |
| 2 | Product of Example 2 | 306.0 |
| 3 | CP436D[2] | 195.3 |
| 4 | De-ionized Water | 1332.5 |

[1]Aqueous dispersion of a sulfonium cationic acrylic resin and a blocked isocyanate curing agent commercially available from PPG Industries, Inc.
[2]Cationic resin containing pigment paste commercially available from PPG Industries, Inc.

Example 4

Preparation of Cationic Electrodepositable Coating Composition

A cationic amine salt electrodepositable coating composition was formed having the formulation disclosed in Table 4. To prepare the coating composition, Charge 1 was added to a one gallon container and diluted with a portion of charge 4. This was then placed under agitation. Charge 2 was diluted with a portion of Charge 4 and added to the diluted charge 1. Charge 3 was diluted with charge 4 and added to the previous mixture. The remainder of charge 4 was added to form the coating composition. In this coating composition, the sum of the polymer (i) and polymeric dispersant (ii) in the coating composition was 20 percent by weight, based on the total weight of resin solids in the composition.

TABLE 4

|   | Chemical | Parts by Weight |
|---|---|---|
| 1 | CR840R[3] | 731.5 |
| 2 | Product of Example 2 | 212.7 |
| 3 | CP817[4] | 52.9 |
| 4 | De-ionized Water | 1252.9 |

[3]Aqueous dispersion of an amine salt cationic acrylic and a blocked isocyanate curing agent commercially available from PPG Industries, Inc.
[4]Cationic resin containing pigment paste commercially available from PPG Industries, Inc.

Example 5

Preparation of Cationic Electrodepositable Coating Composition

A cationic amine salt electrodepositable coating composition was formed having the formulation disclosed in Table 5. To prepare the coating composition, Charge 1 was added to a one gallon container and diluted with a portion of charge 4. This was then placed under agitation. Charge 2 was diluted with a portion of Charge 4 and added to the diluted charge 1. Charge 3 was diluted with charge 4 and added to the previous mixture. The remainder of charge 4 was added to form the coating composition. In this coating composition, the sum of the polymer (i) and polymeric dispersant (ii) in the coating composition was 10 percent by weight, based on the total weight of resin solids in the composition.

TABLE 5

|   | Chemical | Parts by Weight |
|---|---|---|
| 1 | CR691B[5] | 1053.5 |
| 2 | Product of Example 2 | 221.8 |
| 3 | CP524[6] | 171.5 |
| 4 | De-ionized Water | 997.7 |

[5]Aqueous dispersion of a cationic epoxy resin and a blocked isocyanate curing agent commercially available from PPG Industries, Inc.
[6]Cationic resin containing pigment paste commercially available from PPG Industries, Inc.

Example 6

Preparation of Comparative Cationic Electrodepositable Coating Composition

A cationic sulfonium acrylic electrodepositable coating composition was formed having the formulation disclosed in Table 6. To prepare the coating composition, Charge 1 was added to a one gallon container and diluted with a portion of charge 3. This was then placed under agitation. Charge 2 was diluted with a portion of Charge 3 and added to the diluted charge 1. The remainder of charge 3 was added to form the coating composition.

TABLE 6

| | Chemical | Parts by Weight |
|---|---|---|
| 1 | CR920H[7] | 639.3 |
| 2 | CP436D[8] | 203.3 |
| 3 | De-ionized Water | 1457.4 |

[7]Aqueous dispersion of a sulfonium cationic acrylic resin and a blocked isocyanate curing agent commercially available from PPG Industries, Inc.
[8]Cationic resin containing pigment paste commercially available from PPG Industries, Inc.

Example 7

Preparation of Comparative Cationic Electrodepositable Coating Composition

An amine salt acrylic electrodepositable coating composition was formed having the formulation disclosed in Table 7. To prepare the coating composition, Charge 1 was added to a one gallon container and diluted with a portion of charge 3. This was then placed under agitation. Charge 2 was diluted with a portion of Charge 3 and added to the diluted charge 1. The remainder of charge 3 was added to form the coating composition.

TABLE 7

| | Chemical | Parts by Weight |
|---|---|---|
| 1 | CR840R[9] | 801.9 |
| 2 | CP817[10] | 58.8 |
| 3 | De-ionized Water | 1639.3 |

[9]Aqueous dispersion of an amine salt cationic acrylic resin and a blocked isocyanate curing agent commercially available from PPG Industries, Inc.
[10]Cationic resin containing pigment paste commercially available from PPG Industries, Inc.

Example 8

Preparation of Comparative Cationic Electrodepositable Coating Composition

An amine salt electrodepositable coating composition was formed having the formulation disclosed in Table 8. To prepare the coating composition, Charge 1 was added to a one gallon container and diluted with a portion of charge 3. This was then placed under agitation. Charge 2 was diluted with a portion of Charge 3 and added to the diluted charge 1. The remainder of charge 3 was added to form the coating composition.

TABLE 8

| | Chemical | Parts by Weight |
|---|---|---|
| 1 | CR691B[11] | 1053.5 |
| 3 | CP524[12] | 154.4 |
| 4 | De-ionized Water | 992.2 |

[11]Aqueous dispersion of a cationic epoxy resin and a blocked isocyanate curing agent commercially available from PPG Industries, Inc.
[12]Cationic paste commercially available from PPG Industries, Inc.

Example 9

Coated Substrates

The coating compositions of Examples 3 to 8 were electrodeposited onto ACT Test Panels according to the conditions set forth in Table 9.

TABLE 9

| Example | Bath Temp (° F.) | Amperage | Voltage | Coating Time (seconds) | Curing Conditions[1] |
|---|---|---|---|---|---|
| 3 | 80 | 0.5 | 200 | 90 | 350° F./20' |
| 6 | 80 | 0.5 | 150 | 90 | 350° F./20' |
| 4 | 90 | 0.5 | 175 | 75 | 350° F./30' |
| 7 | 90 | 0.5 | 150 | 75 | 350° F./30' |
| 5 | 90 | 0.5 | 250 | 90 | 350° F./30' |
| 8 | 90 | 0.5 | 230 | 90 | 350° F./30' |

[1]All paints were cured in a direct fire gas oven.

Gloss and Impact Testing Results

The cured coatings were evaluated for gloss (20 and 60 degree) and flexibility (direct impact, reverse impact and mandrel bend). The results are provided in Table 10.

TABLE 10

| Example | 20° Gloss | 60° Gloss | Direct Impact[13] | Reverse Impact[14] | Mandrel Bend[15] |
|---|---|---|---|---|---|
| 3[16] | 1.3 | 5.9 | 60 | 10 | 0 |
| 6[16] | 51.3 | 83.4 | 65 | 20 | 0 |
| 4[17] | 2.3 | 19.8 | 60 | 10 | 0 |
| 7[17] | 25.1 | 63.6 | 80 | 20 | 0 |
| 5[18] | 8.1 | 45.8 | 120 | 25 | 0 |
| 8[18] | 21.9 | 70.5 | 110 | 15 | 0 |

[13]Measured in inch-pounds according to ASTM D 2794.
[14]Measured in inch-pounds according to ASTM D 2794.
[15]Measured in millimeters for lift or cracking according the ASTM D 522.
[16]Substrate was a cold rolled steel panel which had been pretreated with a zinc phosphate followed by a chrome rinse (commercially available from ACT Laboratories as APR 19218).
[17]Substrate was a cold rolled steel substrate which had been pretreated with iron phosphate followed by a non-chrome rinse (commercially available from ACT Laboratories as APR 33446).
[18]Substrate was a cold rolled steel substrate which had been pretreated with iron phosphate followed by a non-chrome rinse (commercially available from ACT Laboratories as APR 47108).

Corrosion Resistance

Cured coatings were also evaluated for corrosion resistance. The results are provided in Table 11.

TABLE 11

| Example | 20 Cycles Corrosion[19] | 500 Hour Salt Spray[20] | 750 Hour Salt Spray[21] |
|---|---|---|---|
| 3 | — | — | 0.3-0.4 |
| 6 | — | — | 1.5-2.3 |
| 5 | 2.3-2.9 | 1.8-3.2 | — |
| 8 | 2.2-3.0 | 1.6-1.9 | — |

[19]Average total scribe creep measured in millimeters. Method GM9540P cyclic testing.
[20]Average total scribe creep measured in millimeters. Method ASTM-B117.
[21]Average total scribe creep measured in millimeters. Method ASTM-B117.

Example 10

Stability of Coating Compositions

In this example, coating compositions of the present invention were evaluated for H-Panel stability.

TABLE 16

| Example | H-Panel Stability Results[22] |
|---|---|
| 3 | No settle or residue |
| 4 | Very little settle or residue |
| 5 | Very little settle or residue |

[22]Stability is measured by the amount of residue on the horizontal edge an L-shaped panel that is coated without agitation of the paint.

Whereas particular embodiments of the invention have been described hereinabove for purposes of illustration, it will be evident to those skilled in the art that numerous variations of the details of the present invention may be made without departing from the invention as defined in the appended claims.

We claim:

1. An electrodepositable coating composition comprising:
   (a) an acrylic polymer that is a polymerization product of a dispersion of a polymerizable ethylenically unsaturated monomer composition polymerized in the presence of a cationic salt group containing polymeric dispersant dispersed in a dispersing medium comprising water, wherein the dispersant has a Mz of 200,000 to 2,000,000, wherein the monomer composition comprises a monomer comprising three or more ethylenically unsaturated groups per molecule, and wherein the water is present in the dispersing medium in an amount of from 40 percent by weight to 90 percent by weight based on the total weight of the dispersion;
   (b) a cationic salt group containing polymer different from the acrylic polymer and polymeric dispersant; and
   (c) a curing agent,
   wherein the sum of the acrylic polymer in (a) and the polymeric dispersant in (a) is greater than 8.0 percent by weight, based on the total weight of resin solids in the composition.

2. The coating composition of claim 1, wherein the acrylic polymer and the polymeric dispersant comprise active hydrogen functional groups.

3. The coating composition of claim 1, wherein the polymeric dispersant comprises an acrylic polymer.

4. The coating composition of claim 3, wherein the polymeric dispersant comprises the reaction product of an ethylenically unsaturated monomer composition comprising:
   (a) a $C_1$-$C_{18}$ alkyl (meth)acrylate;
   (b) a hydroxy-functional (meth)acrylate;
   (c) a vinyl aromatic compound;
   (d) an epoxide functional monomer; and
   (e) a monomer comprising two ethylenically unsaturated groups per molecule.

5. The coating composition of claim 3, wherein the polymeric dispersant comprises the reaction product of an ethylenically unsaturated monomer composition comprising:
   (a) 50 up to 70 percent by weight of a $C_1$-$C_{18}$ alkyl (meth)acrylate;
   (b) 5 up to 25 percent by weight of a hydroxy-functional (meth)acrylate;
   (c) 1 up to 10 percent by weight of a vinyl aromatic compound;
   (d) 10 up to 20 percent by weight of an epoxide functional monomer; and
   (e) 0.1 to 5 percent by weight of a monomer comprising two ethylenically unsaturated groups per molecule.

6. The coating composition of claim 1, wherein the polymeric dispersant has a Mz of 450,000 to 2,000,000.

7. The coating composition of claim 1, wherein the acrylic polymer is a polymerization product of a polymerizable ethylenically unsaturated monomer composition that is substantially free of diene monomers.

8. The coating composition of claim 1, wherein the monomer comprising three or more ethylenically unsaturated groups per molecule comprises a tri(meth)acrylate.

9. The coating composition of claim 1, wherein the acrylic polymer is a polymerization product of a polymerizable ethylenically unsaturated monomer composition comprising:
   (a) a $C_1$-$C_{18}$ alkyl (meth)acrylate;
   (b) a hydroxy-functional (meth)acrylate;
   (c) a vinyl aromatic compound; and
   (d) a monomer comprising three or more ethylenically unsaturated groups per molecule.

10. The coating composition of claim 9, wherein the acrylic polymer is a polymerization product of a polymerizable ethylenically unsaturated monomer composition comprising:
    (a) 20 up to 60 percent by weight of the $C_1$-$C_{18}$ alkyl (meth)acrylate;
    (b) 5 up to 15 percent by weight of the hydroxy-functional (meth)acrylate;
    (c) 20 up to 60 percent by weight of the vinyl aromatic compound; and
    (d) 0.1 to 5 percent by weight of a monomer comprising three or more ethylenically unsaturated groups per molecule.

11. The coating composition of claim 1, wherein (b) comprises an amine salt group-containing polymer and/or a sulfonium salt group containing polymer.

12. The coating composition of claim 1, wherein the sum of the acrylic polymer in (a) and the polymeric dispersant in (a) in the coating composition is at least 10.0 percent by weight, based on the total weight of resin solids in the coating composition.

13. The coating composition of claim 1, wherein the sum of the acrylic polymer in (a) and the polymeric dispersant in (a) in the coating composition is at least 15.0 percent by weight, based on the total weight of resin solids in the coating composition.

14. The coating composition of claim 1, wherein the sum of the acrylic polymer in (a) and the polymeric dispersant in (a) in the coating composition is at least 20.0 percent by weight, based on the total weight of resin solids in the coating composition.

15. The coating composition of claim 1, wherein the sum of the acrylic polymer in (a) and the polymeric dispersant in (a) in the coating composition is at least 25.0 percent by weight, based on the total weight of resin solids in the coating composition.

16. A method comprising:
    (a) electrophoretically depositing on a substrate the electrodepositable coating composition of claim 1; and
    (b) heating the composition to a temperature and for a time sufficient to cure the composition on the substrate to provide a cured coating.

17. The method of claim 16, wherein the cured coating has a 20° gloss of no more than 10.

18. The method of claim 17, wherein the cured coating has a 20° gloss of no more than 5.

19. The method of claim 18, wherein the cured coating has a 20° gloss of no more than 3.

20. An electrodepositable coating composition comprising:
    (a) an acrylic polymer that is a polymerization product of a dispersion of a polymerizable ethylenically unsaturated monomer composition polymerized in the presence of a cationic salt group containing polymeric dispersant dispersed in a dispersing medium comprising water, wherein the dispersant has a Mz of 200,000 to 2,000,000;

wherein the polymeric dispersant comprises the reaction product of an ethylenically unsaturated monomer composition comprising:
  (i) 50 up to 70 percent by weight of a $C_1$-$C_{18}$ alkyl (meth)acrylate;
  (ii) 5 up to 25 percent by weight of a hydroxy-functional (meth)acrylate;
  (iii) 1 up to 10 percent by weight of a vinyl aromatic compound;
  (iv) 10 up to 20 percent by weight of a epoxide functional monomer; and
  (v) 0.1 to 5 percent by weight of a monomer comprising two ethylenically unsaturated groups per molecule;
wherein the acrylic polymer is a polymerization product of a polymerizable ethylenically unsaturated monomer composition comprising:
  (i) 20 up to 60 percent by weight of a $C_1$-$C_{18}$ alkyl (meth)acrylate;
  (ii) 5 up to 15 percent by weight of a hydroxy-functional (meth)acrylate;
  (iii) 20 up to 60 percent by weight of a vinyl aromatic compound; and
  (iv) 0.1 to 5 percent by weight of a monomer comprising three or more ethylenically unsaturated groups per molecule;
(b) a cationic salt group containing polymer different from the acrylic polymer and polymeric dispersant; and
(c) a curing agent,
wherein the sum of the acrylic polymer in (a) and the polymeric dispersant in (a) is greater than 8.0 percent by weight, based on the total weight of resin solids in the composition.

* * * * *